June 30, 1953  M. SOSS  2,643,623

SEEDING MACHINE

Filed Nov. 10, 1949

INVENTOR,
MARK SOSS

BY Glenn L. Fish

ATTORNEY

Patented June 30, 1953

2,643,623

UNITED STATES PATENT OFFICE 2,643,623

SEEDING MACHINE

Mark Soss, Spokane, Wash.

Application November 10, 1949, Serial No. 126,551

1 Claims. (Cl. 111—61)

This invention relates to a seeding machine and it is one object of the invention to provide a seeder which is adapted to be mounted upon a motor vehicle, such as a "Jeep," at the front thereof and deposit seed in the ground as the vehicle is driven across a field.

Another object of the invention is to provide a seeder having a frame carrying plowing mechanism for opening seed-receiving furrows, mechanism for depositing seed in the furrows, and a harrow for covering the seed with soil.

Another object of the invention is to provide a seeder of this character wherein the plowing mechanism and the harrow are shiftable vertically into and out of engagement with the ground and into such a vertically adjusted position that they will penetrate the soil a predetermined depth.

Another object of the invention is to provide plowing mechanism and a harrow having adjusting means so arranged that the plow and the harrow may be simultaneously shifted vertically to adjusted positions and both thus adjusted by a single operation.

Another object of the invention is to provide a seeder having its seed box or hopper provided with feed means adapted to be driven from a power take-off at the front of the "Jeep" to which the seeder is applied.

Another object of the invention is to provide a seeder which is simple in construction, efficient in operation, and very strong so that it may be subjected to rough use without being damaged.

The invention is illustrated in the accompanying drawings wherein.

This improved seeding machine is attached to a motor vehicle 1 when in use and while the motor vehicle is illustrated as a "Jeep" it will be understood that it may be other types of motor vehicles. The vehicle has front and rear wheels 2 and 3 and at its front end is provided with a conventional power takeoff 4 having a forwardly projecting rotary shaft 5.

Figure 2:
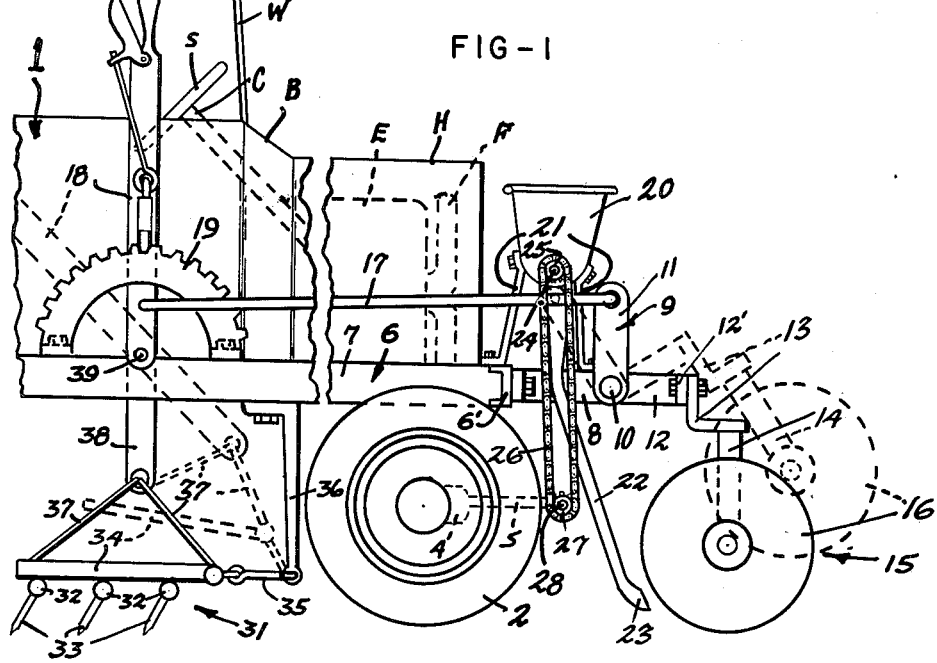
Fig. 2 is a side elevation of the seeder.

The vehicle is illustrated in Figure 2 as having a body B including the conventional windshield W and forward hood H. The power plant or engine E is supported by the chassis 6 under the hood H and is provided with the usual fan F. The steering wheel is indicated at S as being supported on the steering column C.

The chassis 6 of the vehicle constitutes a support frame for the seeder and has side bars 7 and a cross bar 6' at its front end. From the front end of the chassis 6 project brackets 8 which carry a bell crank structure 9 consisting of a rock shaft 10, an upstanding arm 11 and forwardly projecting arms 12 having their front ends bent laterally to provide extensions 12' to which are secured angle brackets 13 extending downwardly and forwardly therefrom. Yokes 14 are supported from the brackets 13 and these yokes carry plows 15 of the disc type, the discs 16 of the plows being spaced transversely from each other and serving to form seed-receiving furrows in the ground as the seeder is moved across a field. A rod 17 connects the upstanding arm 11 of the bell crank structure 9 with a latch lever 18 carried by the chassis 6 at one side and having the usual rack 19 associated with it, and when the latch lever is tilted rearwardly towards the position indicated by dotted lines in Figure 2 the bell crank structure will be tilted and the plows swung upwardly out of contact with the ground and allow the motor vehicle and the seeder carried thereby to be moved from one field to another or a turn to be made without interference by the plows. When the latch lever is tilted forwardly the plows are lowered and held in a position in which they will penetrate the ground and form trenches of a desired depth.

Figure 1:
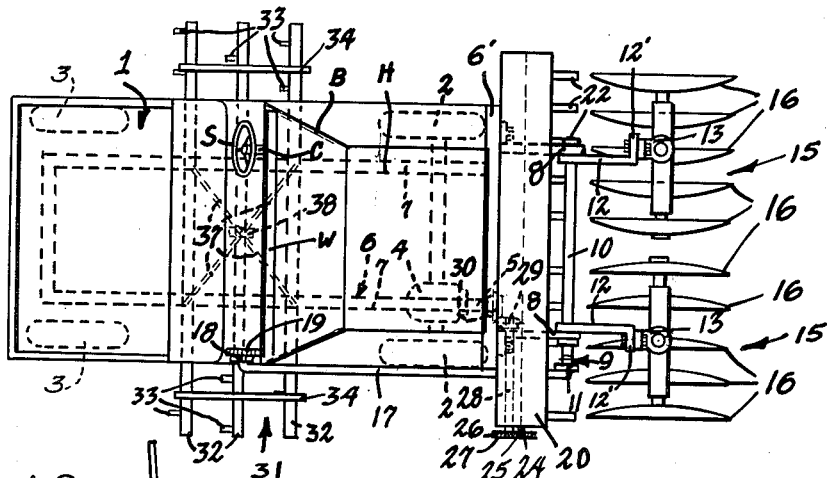
Fig. 1 is a top plan view showing a seeder of the improved construction mounted upon a motor vehicle.

Back of the plows there has been provided means for sowing seed. This seeding mechanism has a box or hopper 20 which extends transversely across the front end of the frame 6 and is supported upwardly therefrom by legs 21 and disposed across the front end of the motor vehicle, as shown in Figure 1. Delivery spouts or ducts 22 which correspond in number to the plow discs extend downwardly from the box and have their lower portions directed forwardly at an incline and terminating at enlarged lower ends or mouths 23 disposed close to and directly back of the plow discs so that seed discharged from the ducts will drop into the furrow formed by the plows. Conventional feeding means is mounted in the box or hopper for causing flow of seed or fertilizer from the box and has a rotary shaft 24. One end portion of the shaft 24 projects from an end of the box and carries a sprocket wheel 25 about which is trained a sprocket chain 26. The chain 26 extends downwardly and has its lower end engaged about a sprocket wheel 27 carried by a rotary shaft 28 which extends inwardly under the brackets 8 and carries a bevelled gear 29 meshing with a bevelled gear 30 carried by the shaft 5 of the power takeoff 4. Since the plows and the ducts are disposed forwardly of the motor vehicle the trenches will be formed and seed deposited therein in advance of the vehicle and the wheels thereof will not fill in the furrows before depositing of the seed.

After the seed has been deposited in the furrows it is desired to have the furrows filled in. In order to do so there has been provided a harrow 31 consisting of transversely extending bars 32 carrying depending teeth 33 and secured to bars 34 which hold them in spaced relation to each other. Links 35 connect the harrow with hanger brackets 36 extending downwardly from the side bars 7 of the chassis 6 so that the harrow will be drawn forwardly back of the front wheels of the vehicle and links 37 which converge upwardly from front and rear edges of the harrow connect the harrow with an arm 38 carried by the pivot pin or shaft 39 of the latch lever. The arm 38 moves with the latch lever and therefore when the lever is tilted to vertically adjust the plows the harrow will also be shifted upwardly or downwardly, according to the direction in which the lever is moved, and when the harrow is in a lowered position with its teeth penetrating the ground it serves to harrow the soil and cause the trenches to be filled and the seed covered.

It will be seen that there has been provided an agricultural machine which is adapted to be applied as an attachment to a motor vehicle, such as a "Jeep" or truck used by farmers, and serve very effectively to form shallow furrows in a field, deposit seed therein, and then fill the furrows to cover the seed. If it is desired to use the implement as a combined plow and harrow it is merely necessary to detach the sprocket chain from the sprocket wheel 28. It is also possible to use the implement only as a plow by detaching the harrow or the implement may be used solely as a harrow by detaching the plows from the forwardly projecting arms of the bell crank structure.

Having thus described the invention, what is claimed is:

An agricultural implement constituting an attachment for a motor vehicle having a chassis, a power take off and front and rear wheels, said implement comprising a flat frame having side bars of a length adapting them to be mounted longitudinally of the motor vehicle along opposite sides thereof and to project forwardly therefrom, brackets projecting forwardly from front ends of said side bars, a rock shaft extending across the front of said frame and rotatably supported forwardly thereof by said brackets, arms projecting forward from end portions of said rock shaft, furrow opening means carried by and extending downwardly from the front ends of said arms, a lever arm projecting upwardly from said rock shaft, a latch lever pivotally mounted upon and projecting upwardly from the rear portion of said frame, a rod connecting said latch lever with said lever arm, a seed container mounted over the front portion of said frame and having means for feeding seed to delivery ducts extending downwardly therefrom with their lower ends disposed rearwardly of the furrow opening means, said feeding means of the seed container including a rotary shaft and means for transmitting rotary motion to the rotary shaft from said power take off of the motor vehicle, depending brackets carried by said side bars rearwardly of the front wheels of the motor vehicle, a harrow disposed rearwardly of said depending brackets and loosely connected therewith by draft links, and supporting links loosely carried by and extending downwardly from the latch lever and connected with front and rear portions of said harrow and suspending the harrow below the latch lever.

MARK SOSS.

References Cited in the file of this patent

UNITED STATES PATENTS

| Number | Name | Date |
|---|---|---|
| 669,560 | Tavenner | Mar. 12, 1901 |
| 1,081,720 | Button et al. | Dec. 16, 1913 |
| 1,174,899 | Rupert | Mar. 7, 1916 |
| 1,288,241 | Simrall | Dec. 17, 1918 |
| 1,787,909 | Krueger | Jan. 6, 1931 |
| 2,054,513 | Kriegbaum et al. | Sept. 15, 1936 |

FOREIGN PATENTS

| Number | Country | Date |
|---|---|---|
| 617,997 | Great Britain | Feb. 15, 1949 |